United States Patent [19]

Tua Espallargas

[11] Patent Number: 4,880,337
[45] Date of Patent: Nov. 14, 1989

[54] MACHINE CUTTER

[75] Inventor: Antonio Tua Espallargas, Barcelona, Spain

[73] Assignee: Fabricacion De Herramientas Y. Utensilios, S.A., Spain

[21] Appl. No.: 96,395

[22] Filed: Sep. 11, 1987

[30] Foreign Application Priority Data

Jul. 23, 1986 [ES] Spain .................................. 8600514

[51] Int. Cl.$^4$ ............................................. B23C 5/20
[52] U.S. Cl. .................................... 407/40; 76/101 A
[58] Field of Search .......................... 76/101 A, 101 R; 407/25, 40, 41

[56] References Cited

U.S. PATENT DOCUMENTS

| 895,219 | 8/1908 | Whittemore et al. | 407/40 |
| 1,224,273 | 5/1917 | Canning | 76/101 A |
| 1,853,667 | 4/1932 | Cummings | 76/101 A |
| 1,867,021 | 7/1932 | Monosmith | 76/101 A |
| 2,567,167 | 9/1951 | Drader | 407/25 |

FOREIGN PATENT DOCUMENTS

| 34208 | 2/1985 | Japan | 407/25 |
| 642084 | 1/1979 | U.S.S.R. | 76/101 A |
| 20333 | 9/1914 | United Kingdom | 76/101 A |

Primary Examiner—Roscoe V. Parker, Jr.
Attorney, Agent, or Firm—Darby & Darby

[57] ABSTRACT

A machine cutter having a cylindrical supporting head having a plurality of slots formed in the lateral surface for receiving a plurality of cutting blades. The cutter further includes an assembly for securing each of the cutter blades in a respective slot. The assembly includes an element having a longitudinal V-groove for defining a passage with a complimentary V-groove formed in each blade, a longitudinal rod removably disposed in the passage and a screw disposable in a bore in the body adjacent to the element and having a tapered surface for engaging a cooperating sloping surface on the element.

3 Claims, 5 Drawing Sheets

MACHINE CUTTER

This Patent relates to improvements to the method of attaching removable blades to rotary cutters such as cylindrical milling cutters fitted with hard material tipped tools on the working face.

Known cutters as currently used consist of separate cutting blades which are not integral with the cutter body and can be separated from it, the whole assembly comprising therefore a support member and a number of cutting tool tips attached thereto. This arrangement allows for one or more of the tool tips, once they are worn or have become broken, to be removed and sharpened and then replaced in position on the cutter body.

Various methods of attaching the tool tips to the cutter body are in use but all of them require the services of the cutter manufacturer in order to carry out the operation of repairing the tools.

The improvements to the method of attaching the removable blades to machine cutters and which are the object of this invention patent present considerable advantages to the currently known existing practices. They allow the machine cutter body, such as that of a milling cutter to be fitted with a set of cutter blades or tool tips by means of an assembly offering complete security and easy replacement operation with the particularity that the cutting tool tips are not refitted to the body being disposable and are made from material with a very high hardness with the cutting edges coated with a thin layer of titanium nitride. They are so designed that once the cutting edges are worn by use, they can be detached from the body of the cutter, removed therefrom and discarded. They are then replaced by new blades, the entire operation being carried out by the operator in the factory without any necessity to send the cutter to the manufacturer for repair. Modern manufacturing techniques and consequent low costs obviate the advantage of re-utilization of the cutting tools after sharpening, the price of such an operation no longer being justified. Once used, the worn tool is discarded and replaced.

This procedure has the advantage that by not re-utilizing the cutting tools on the cutter and by simply replacing the tools or blades in the cutter, an operation that is both simple and economic, there is a saving in material as the cutter body remains in service only the cutting elements having to be renewed. The coating material, normally titanium nitride, is used in its entirety. Milling cutter tool replacement can be automatic with high speed operation and cutting rates, thus increasing production. Tool changes can be carried out by the machine minder operating the milling machine in which the cutter is fitted in accordance with the improvements related to the replaceable tools as described herein, thus obviating sending the cutter out to the manufacturer for dressing.

To facilitate the description drawings are attached showing by way of a non exclusive illustration one embodiment of the improvements to the method of attaching removable cutting blades to machine cutters in accordance with the claims of this patent.

Figure 1:
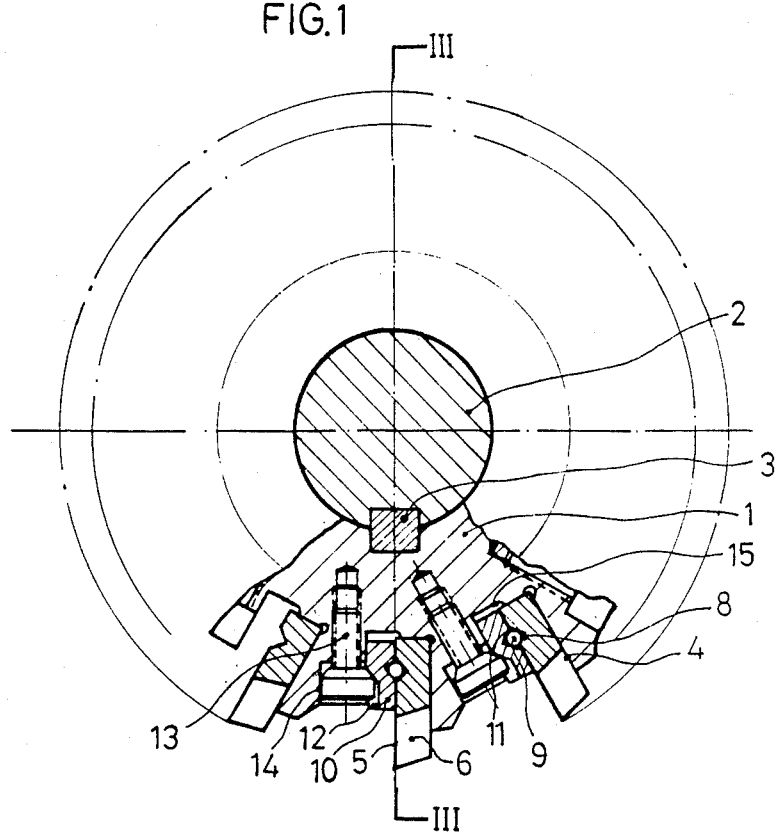
FIG. 1 is a front view, in partial cross section of a machine cutting tool of the milling machine type of rotary cutter, carrying the improvements as described in this patent
Figure 2:
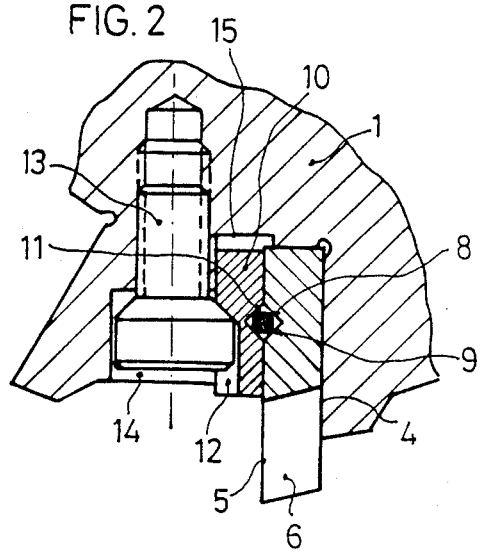
FIG. 2 is an enlarged scale detail of the method of assembly.
Figure 3:
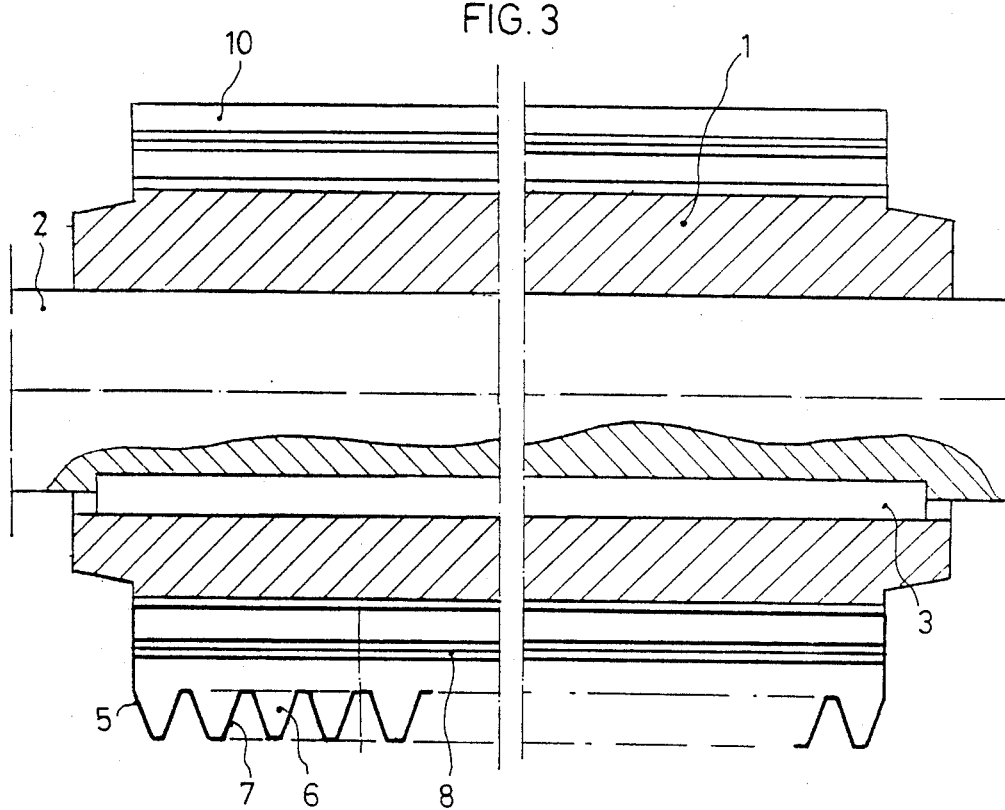
FIG. 3 shows a longitudinal cross section on a plane III—III through the centre line on FIG. 1 showing the described assembly system.

The numbering on the drawings refer to the corresponding components of the cutter carrying the improvements in accordance with this patent as described below and similarly numbered.

The cutter to which the improvements as described have been applied, shown in the drawings in the form of a milling cutter of the rotary type consists of a cylindrical shaped body 1 with a central bore to take the machine arbor 2 on to which it is keyed by means of a conventional key 3.

A plurality of slots 4 are provided in the cylindrical surface of the body 1 and which house, temporarily, the cutting tools 5 made from a steel having the appropriate properties and coated superficially, at least on the operating surfaces with a layer of titanium nitride, having a high hardness and constituting the operative part of the cutting element and hence of the milling cutter as a whole. These components are designed in such a manner that once worn by use, after their programmed utilization period which could coincide with the life of the titanium nitride coating, they are discarded without attempting to dress and they are then replaced by others with the same characteristics.

Each individual cutting blade 5 is in the form of an elongated prism, one of its edges being a series of projections 6 forming teeth designed to suit the milling operation programmed for the machine in question, the cutting edges 7 having the appropriate angle for the operation to be performed. One face of the element 5 has a longitudinal groove 8 forming a triangular section or Vee in which a longitudinal rod 9 is partially lodged for the purpose of securing the cutter element in its correct position.

The assembly arrangement of the blades 5 is completed by an elongated prismatic body 10 of the same length as the blades and also having a groove with a triangular or Vee cross section 11, similar to 8. The component 10 is held in its position by means of screws 13 the heads of which are located in the external part of the body 1 and in suitably dimensioned recesses 14 therein as well as in the recesses 12 in the retention component itself. Once the screws have been positioned and adequately tightened they act to secure the longitudinal component 10 against the cutting blade 5, this together with the action of the rod 9, ensuring that the blade remains solidly in its operating position.

Figure 4:
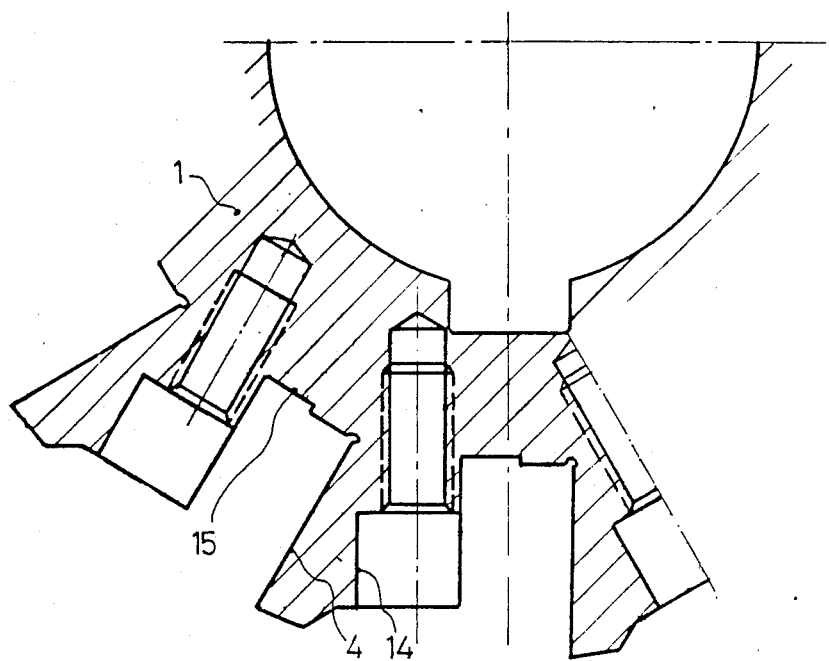
FIG. 4 shows a partial cross section of the cutter to a larger scale without the cutting blades or the retention components.
Figure 5:
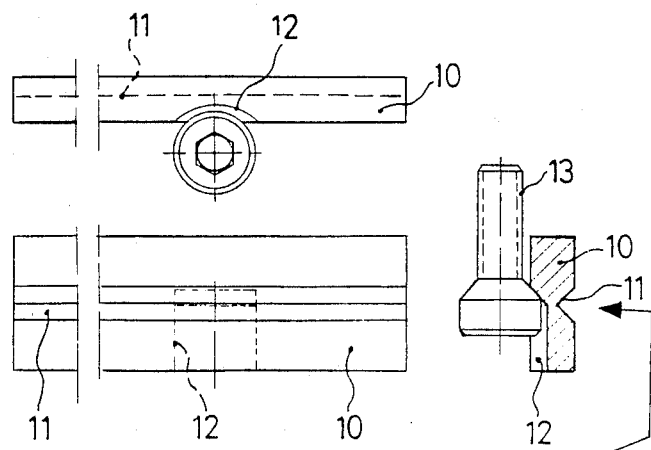
FIG. 5 is a dihedral projection with cross sectional views of the cutting blades and the components acting as retention means.
Figure 5:
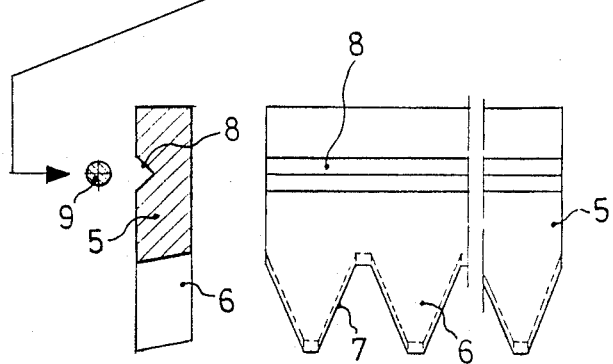
Figure 6:
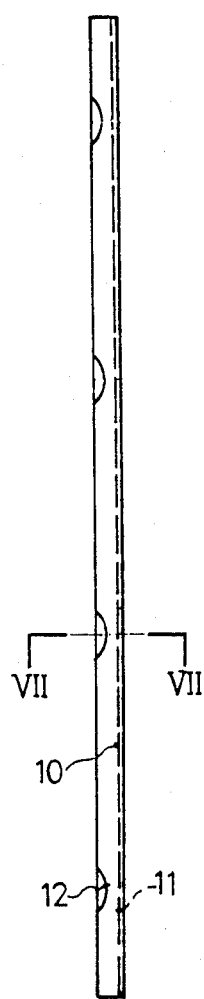
FIG. 6 is a lateral projection of the retention component in the assembly of the cutting tool and FIG. 7 is a cross section of the same on the plane VII—VII.
Figure 8:
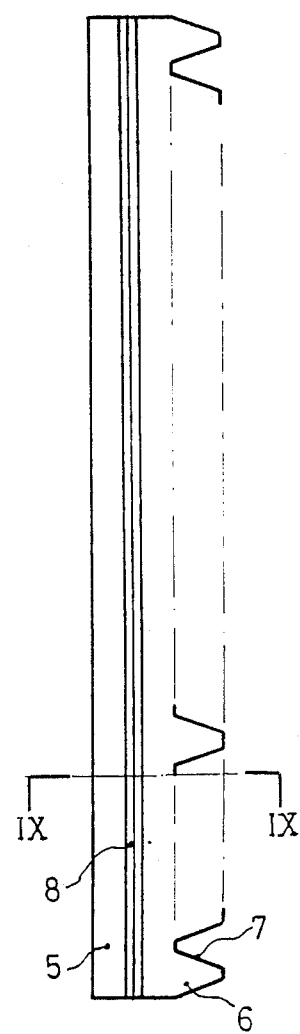
FIG. 8 is a lateral view of one of the cutting blades, FIG. 9 being a cross section of the same on the plane IX—IX of FIG. 8.
Figure 7:
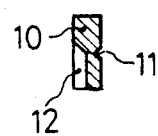
Figure 9:
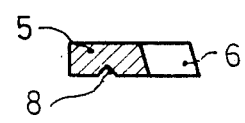

The retention components 10 stay lodged in the spaces 15, adjacent to the spaces 4 which house the cutter blades 5 as may be seen in FIG. 4.

The retaining screws 13 are so arranged that their ideal axes are coplanar and lie parallel to a radial plane (that is: passing through the axis of the arbor bore), which is coincident with the plane of the surface of repose of the blade 5 and its corresponding retention component 10.

Anything which does not alter, change, modify or otherwise affect the essentiality of the improvements herein described is to be considered a variable for the purposes of this invention patent.

I claim:

1. A machine cutter having a cylindrical supporting head, a plurality of slots provided in a lateral surface of the head, a plurality of cutting blades disposed in the slots, and means for retaining and securing the cutting blades in the slots, the retaining means comprising:

a plurality of elements, housed within the slots, adjacent to the cutting blades, each element having a longitudinal V-shaped groove, each blade having a complimentary V-shaped groove, such that when the blade is adjacent the element, the grooves form a passage, each element further having a sloped surface on a face opposite to a blade engaging face;

a screw, disposable in a bore in the body, adjacent to the element, the screw having a complimentary tapered surface for engaging the sloped element surface; and, a longitudinal rod removably disposed in the passage provided by the mating of the complimentary V-shaped grooves, wherein the securing of the screw to the head locks the element against the cutter blade, with the element and the rod securing the blade in the head.

2. The machine cutter of claim 1 wherein each cutter blade is in the form of an elongated prism with its length equal to that of the cylindrical supporting head; each cutter blade having cutting edges coated with a thin layer of a very hard material.

3. The machine cutter of claim 1 wherein the screws engaging the elements are co-planar and are parallel to the radial plane passing through the axis of the cutter head, and are coincident with the plane of the surface of repose of the cutter blades and the corresponding elements.

* * * * *